US009749584B2

(12) United States Patent
Martinez et al.

(10) Patent No.: US 9,749,584 B2
(45) Date of Patent: Aug. 29, 2017

(54) MUTING A VIDEOCONFERENCE (71) Applicant: Hewlett-Packard Development Company, L.P., Houston, TX (US)

(72) Inventors: Juan Martinez, Spring, TX (US); Chi So, Spring, TX (US); James McClellan, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/306,666

(22) PCT Filed: Apr. 28, 2014

(86) PCT No.: PCT/US2014/035752
§ 371 (c)(1),
(2) Date: Oct. 25, 2016

(87) PCT Pub. No.: WO2015/167441
PCT Pub. Date: Nov. 5, 2015

(65) Prior Publication Data
US 2017/0048490 A1 Feb. 16, 2017

(51) Int. Cl.
H04N 7/14 (2006.01)
H04N 7/15 (2006.01)
G06K 9/00 (2006.01)
G10L 15/26 (2006.01)
G11B 27/00 (2006.01)
H04N 5/232 (2006.01)
H04N 5/76 (2006.01)

(52) U.S. Cl.
CPC ......... H04N 7/147 (2013.01); G06K 9/00221 (2013.01); G10L 15/265 (2013.01); G11B 27/007 (2013.01); H04N 5/23206 (2013.01); H04N 5/76 (2013.01); H04N 7/152 (2013.01)

(58) Field of Classification Search
CPC .......... H04N 7/14; H04N 7/15; H04N 21/233; H04N 21/23418; H04N 23/23439; H04N 21/440236; G06K 9/00261; G06K 9/00771; F02D 9/1035; F02M 35/1038
USPC ............ 348/14.01, 14.07, 14.08, 14.09, 14.1
See application file for complete search history.

(56) References Cited

U.S. PATENT DOCUMENTS 6,020,916 A * 2/2000 Gerszberg ................ H04N 7/14
348/14.01
8,120,638 B2 * 2/2012 Kenoyer .................. H04N 7/15
348/14.07
8,310,521 B2 11/2012 Zhang et al.
8,681,203 B1 3/2014 Yin et al.
(Continued)

FOREIGN PATENT DOCUMENTS

CN 101783920 A 7/2010

Primary Examiner — Binh Tieu
(74) Attorney, Agent, or Firm — HP Inc. Patent Department (57) ABSTRACT A video conferencing system conducting a videoconference comprising a computing device comprising a processor that, upon receiving input to mute the videoconference from a first participant of the videoconference creates a looping video and displays the looping video to a number of participants of the videoconference and converts detected speech of a number of participants of the videoconference into text and displays the text on a monitor of the computing device.

10 Claims, 3 Drawing Sheets (56) References Cited

U.S. PATENT DOCUMENTS

| | | | |
|---|---|---|---|
| 8,970,662 B2* | 3/2015 | Kerger | H04W 76/005 |
| | | | 348/14.02 |
| 9,230,546 B2* | 1/2016 | O'Sullivan | G10L 15/26 |
| 9,560,414 B1* | 1/2017 | Chalasani | G09G 5/377 |
| 2007/0153091 A1* | 7/2007 | Watlington | H04N 7/15 |
| | | | 348/208.14 |
| 2007/0188599 A1 | 8/2007 | Kenoyer | |
| 2008/0136895 A1 | 6/2008 | Mareachen | |
| 2011/0279638 A1 | 11/2011 | Periyannan et al. | |
| 2013/0002801 A1 | 1/2013 | Mock | |
| 2013/0058741 A1 | 3/2013 | Fujimori et al. | |
| 2015/0097949 A1* | 4/2015 | Ure | G08B 5/223 |
| | | | 348/143 |
| 2015/0156031 A1* | 6/2015 | Fadell | H04L 12/2816 |
| | | | 700/276 |
| 2016/0182727 A1* | 6/2016 | Baran | H04M 3/568 |
| | | | 379/88.02 |
| 2017/0032377 A1* | 2/2017 | Navaratnam | G06Q 30/016 |

* cited by examiner

MUTING A VIDEOCONFERENCE

BACKGROUND

Video conferencing provides personal communication between any number of users using a video conferencing system. These systems allow for users to hear and view those other users engaged in a conversation. In some instances, those users participating in the conversation are miles away from each other.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

As briefly mentioned above, video conferencing systems present a plurality of users with the ability to engage in and listen to conversations with and between other users. These systems provide a video and audio feed received from a first party to a screen and speakers located at the physical location of a second party. Any number of users may be connected to the group of users, with each user implementing a computing device that is configured to receive the video and audio feed.

During a videoconference, any number of users may be accessing the video and audio feeds associated with the presentation. These users may be a varying degree of interest in the subject matter being discussed or participation in the presentation of that subject matter. Indeed, some users may be those persons who are responsible for leading the discussion while at the other extreme other may simply have engaged in the videoconference because of a technical requirement to "attend" the videoconference. As such, some users may find themselves being distracted by other work or events while watching the videoconference simply because their undivided attention is not required. However, there may be occasions during the discussion where those users who are not invested in the conversation are required to give input to various topics or answer questions presented to them. In these instances, those relatively less invested users, after being distracted, may have to ask for the question or comment to be repeated. This may cause such a user embarrassment.

Additionally, some users may engage in the videoconference at their personal homes or professional offices. In some instances, these locations may comprise viewable scenery that would cause embarrassment to the users or potentially allow others to see subject matter that they should not be allowed to view. For example, where a first user engages in a videoconference at his or her office, that office may comprise, for example, a white board on which the first user has documented or described sensitive subject matter that others should not be viewing or that the first user should not be disseminating to others. Additionally, it may be embarrassing for a user to engage in a videoconference at his or her home because others engaged in the videoconference may see the residential home room as being an unprofessional location at which to conduct a videoconference.

The present specification, therefore, describes a video conferencing system conducting a videoconference comprising a computing device comprising a processor that, upon receiving input to mute the videoconference from a first participant of the videoconference creates a looping video and displays the looping video to a number of participants of the videoconference and converts detected speech of a number of participants of the videoconference into text and displays the text on a monitor of the computing device.

The present specification further describes a method of muting a videoconference on a computing device comprises, with a processor of the computing device, receiving input to mute the videoconference from a first participant of a videoconference, presenting a looping video to participants of the videoconference, recognizing speech of participants of the videoconference, converting speech of participants of the videoconference into text, and displaying text on a monitor of the computing device.

Additionally, the present specification further describes a computer program product for muting a videoconference on a computing device, the computer program product comprising a computer readable storage medium comprising computer usable program code embodied therewith, the computer usable program code comprising computer usable program code to, when executed by a processor, receive input to mute the videoconference from a first participant of a videoconference, computer usable program code to, when executed by a processor, present a looping video to participants of the videoconference, computer usable program code to, when executed by a processor, recognize speech of participants of the videoconference, computer usable program code to, when executed by a processor, convert speech of participants of the videoconference into text, and computer usable program code to, when executed by a processor, display text on a monitor the computing device.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims, the term "videoconferencing" is meant to be understood broadly as the communication between two or more users at separate locations or computing devices via simultaneous two-way video and audio transmissions. As such, when videoconferencing, a user is engaged in a videoconference between him or herself and another user of a computing system.

Additionally, in the present specification and in the appended claims, the term "participant" is meant to be understood broadly as user of a computing device who is listening to and/or viewing a videoconference.

Further, in the present specification and in the appended claims, the term "user" is meant to be understood broadly as a person implementing a number of devices associated with a videoconferencing system.

Even still further, as used in the present specification and in the appended claims, the term "a number of" or similar language is meant to be understood broadly as any positive number comprising 1 to infinity; zero not being a number, but the absence of a number. The term "a plurality of" is meant to be understood broadly as any positive number comprising 2 to infinity.

Figure 1:
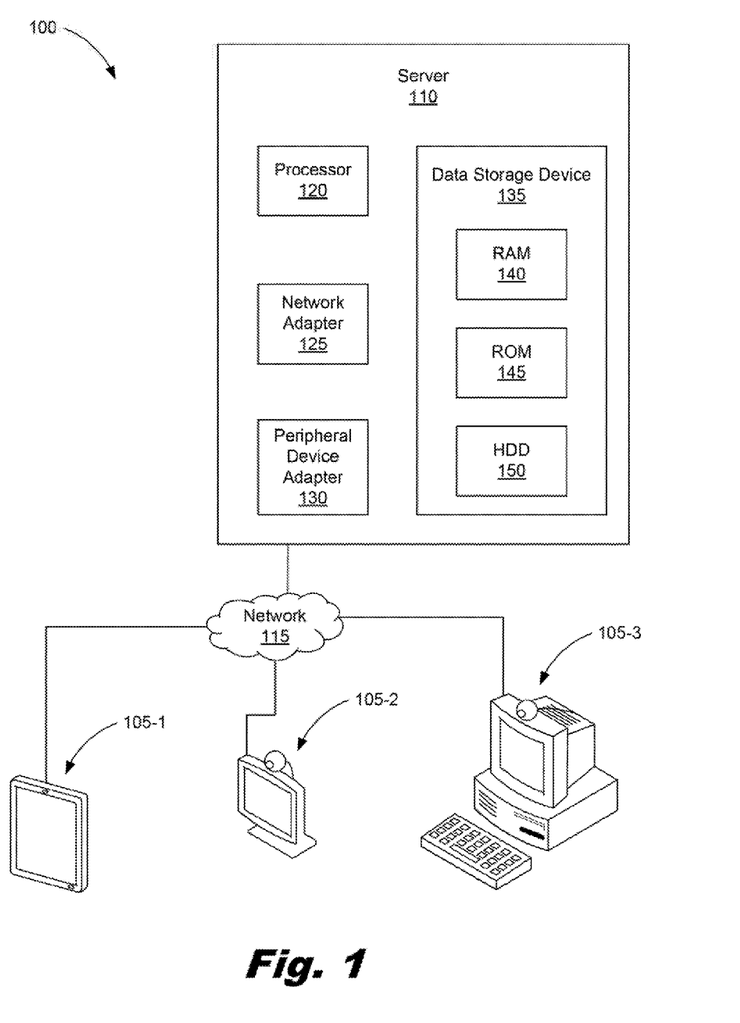
FIG. 1 is a block diagram of a videoconferencing system according to one example of principles described herein.

FIG. 1 is a block diagram of a videoconferencing system (100) according to one example of principles described herein. The system (100) may comprise a number of computing devices (105-1, 105-2, 105-3; generally 105) and a server (110). The computing devices (105) may be communicatively coupled to the server (110) via a network (115). These will now be discussed in more detail.

The network (115) may be any type of computing network that allows the computing devices (105) to communicate with the server as well as each other. The network (115) may be an internet, an intranet, the Internet, or a world-wide-web.

The server (110) may comprise a processor (120), a network adapter (125), a peripheral device adapter (130), and a data storage device (135). The processor (120) may receive computer usable code from the memory (135) and execute that code to perform at least the functionality of the system (100) as described herein. Specifically, the processor (120) may receive video and audio feeds from a computing device (105) and deliver that audio and video feed to the other computing devices associated with a videoconference. The processor may further allow for the coordination of the videoconference by allowing or disallowing users from connecting to the server (110) and receiving the audio/video feed.

The network adapter (125) allows the server (110) to communicatively connect to the network (115). The peripheral device adapter (130) and network adapter (125) in the server (110) enable the processor (120) to interface with various other hardware elements, external and internal to the server (110). For example, the peripheral device adapter (130) may provide an interface to input/output devices, such as, for example, a printer.

The peripheral device adapter (130) may also create an interface between the processor (120) and a printer or other media output device. For example, the server (110) may further comprise a monitor to which data may be sent in order to provide a user with a user interface.

The data storage device (135) may include various types of memory modules, including volatile and nonvolatile memory. For example, the data storage device (135) of the present example includes Random Access Memory (RAM) (140), Read Only Memory (ROM) (145), and Hard Disk Drive (HDD) memory (150). Many other types of memory may also be utilized, and the present specification contemplates the use of many varying type(s) of memory in the data storage device (135) as may suit a particular application of the principles described herein. In certain examples, different types of memory in the data storage device (135) may be used for different data storage needs. For example, in certain examples the processor (120) may boot from Read Only Memory (ROM) (145), maintain nonvolatile storage in the Hard Disk Drive (HDD) memory (150), and execute program code stored in Random Access Memory (RAM) (145).

Generally, the data storage device (135) may comprise a computer readable storage medium. For example, the data storage device (135) may be, but not limited to, an apparatus, system, or device implementing electronic, magnetic, optical, electromagnetic, infrared, or semiconductor mechanisms or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

Although FIG. 1 shows a server being implemented as, in this example, an intermediary between the number of computing devices (105), other examples of the system (100) exist that do not include a dedicated server (110) to act as such an intermediary. In this example, the computing devices (105) may comprise similar devices as those described in connection with the server (110) of FIG. 1 to accomplish the functionality of the system (100) described herein. The computing devices (105) will now be described in more details.

Figure 2:
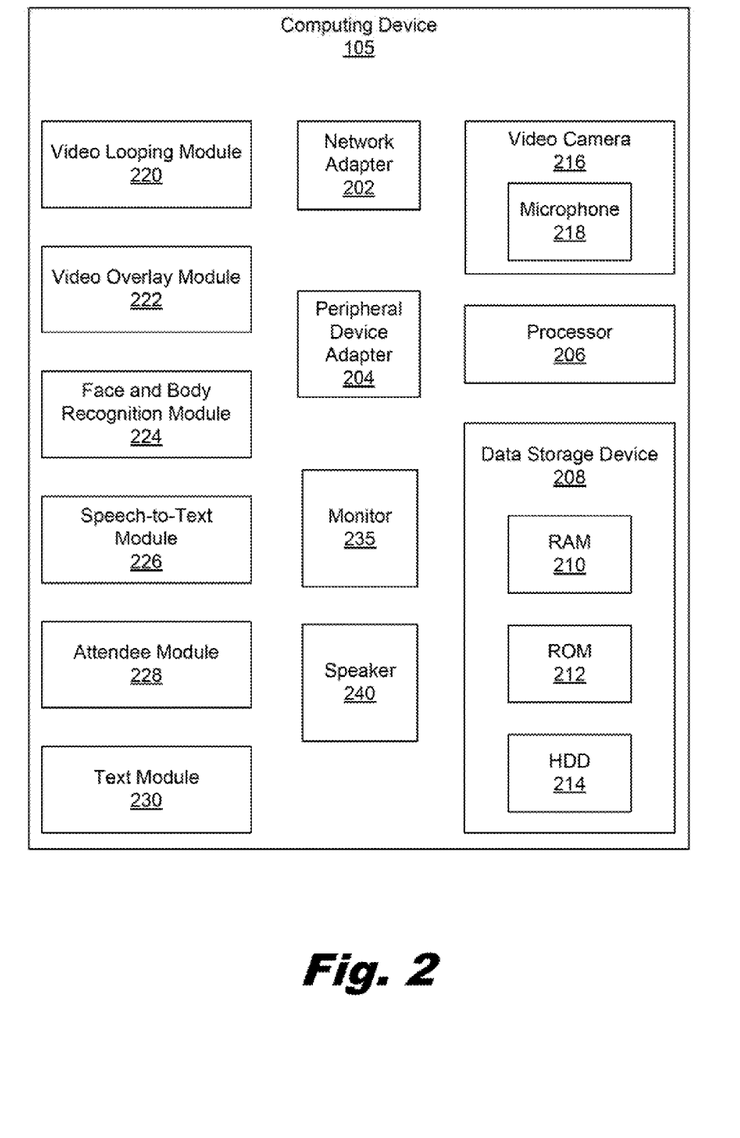
FIG. 2 is a block diagram of a computing device of the system of FIG. 1 according to one example of principles described herein.

FIG. 2 is a block diagram of a computing device (105) of the system (100) of FIG. 1 according to one example of principles described herein. The computing device (105) may comprise a network (202) and peripheral device adapter (204) as described above in connection with FIG. 1. The network adapter (202) allows the computing device (105) to communicatively connect to the network (FIG. 1, 115). The peripheral device adapter (204) and network adapter (202) of the computing device (105) enable a processor (206) to interface with various other hardware elements, external and internal to the computing device (105). For example, the peripheral device adapter (204) may provide an interface to input/output devices, such as, for example, a printer, a mouse, a monitor, among others.

As mentioned above, the computing device (105) may further comprise a processor (206). The processor (206) may receive computer usable code from a data storage device (208) and execute that code to perform at least the functionality of the system (100) and computing device (105) as described herein. Specifically, the processor (206) may receive video and audio feeds from a server (FIG. 1, 110) or another computing device (105) and deliver that audio and video feed to a monitor associated with the computing device (105). The processor (206) may further allow for the coordination of the videoconferencing such that the user of the computing device (105) is granted access to hear and view the audio/visual content of the videoconference.

The data storage device (208) may include various types of memory modules similar to that of the server (FIG. 1, 110), including volatile and nonvolatile memory. For example, the data storage device (208) of the present example includes Random Access Memory (RAM) (210), Read Only Memory (ROM) (212), and Hard Disk Drive (HDD) memory (214). Many other types of memory may also be utilized, and the present specification contemplates the USC of many varying type(s) of memory in the data storage device (208) as may suit a particular application of the principles described herein. In certain examples, different types of memory in the data storage device (208) may be used for different data storage needs. For example, in certain examples the processor (206) may boot from Read Only Memory (ROM) (212), maintain nonvolatile storage in the Hard Disk Drive (HDD) memory (214), and execute program code stored in Random Access Memory (RAM) (210).

Generally, the data storage device (208) may comprise a computer readable storage medium. For example, the data storage device (208) may be, but not limited to, an apparatus, system, or device implementing electronic, magnetic, optical, electromagnetic, infrared, or semiconductor mechanisms or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The computing device (105) may further comprise a video camera (216). The video camera (216) may be communicatively coupled to the processor (204) via the peripheral device adapter (204). The video camera (216) may acquire video footage of a user of the computing device (105) and his or her surrounds. In one example, the video camera (216) is a depth aware video camera such as a structured light or time-of-flight camera. In another example, the video camera (216) may use facial recognition software to recognize facial and/or body features of an individual user.

The processor (206) may receive the streaming video and augment it pursuant to the description herein. In one example, the processor (206) may receive the video stream and, with the data received from the depth-aware camera (216), recognize when a user is and is not in front of the camera/screen of the computing device (105). In this example, when the user is not in front of the camera/screen of the computing device (105), a mute function may be initialized such that detected audio originating from a microphone (218) of the camera (216) is not delivered to the rest of the users of the videoconferencing system (FIG. 1, 100). In another example, the processor (206) may receive the video stream and, with the data received from the depth aware camera (216), overlay any background appearing behind the user of the computing device (105) with another background. The background may be any image of the user's choosing or a blank image sufficient to hide the user's specific location or subject matter appearing behind the user.

In order to accomplish these tasks as well as others, the computing device (105) may further comprise a video looping module (220), a video overly module (222), a face and body recognition module (224), a speech-to-text module (226), and attendee module (228), and a text module (230). The various modules within the computing device (105) comprise executable program code that may be executed separately. In this example, the various modules may be stored as separate computer program products. In another example, the various modules within the computing device (105) may be combined within a number of computer program products; each computer program product comprising a number of the modules. Each module is executed by the processor (206). Each of these will now be described in detail.

The video looping module (220) is communicatively coupled to the video camera (216) and processor (203). The processor (206), upon receipt of the stream of video from the video camera (213), may implement the video looping module (220) to cut a portion of the video stream out and use it to form a looping portion of video. When a user activates a muting option or, alternatively, a video looping option, the video looping module (220) may replace the current video stream acquired by the video camera (216) with the looping portion of video and use that as the video output sent to other users of computing devices (105) currently engaged in the videoconference. This allows the user of the computing device (105) to move away from the video camera (216) and potentially engage in activities separate from the videoconference.

In one example, the video looping module (220) may form the looping video such that others viewing the video will not notice a jump in the video feed. For example, the video looping module (220) may, upon activation by a user to do so, request that the user place his or her face in front of the video camera (216). Using the face and body recognition module (224), the video looping module (220) may receive confirmation that the user is in front of the video camera (216). Once this has been detected by the video looping module (220), the video looping module (220) may then receive the video stream from the video camera (216) and begin to compile a looping video stream. After a predetermined period of time, the video looping module (220) may use that looping video stream as video output to the system (100). However, the position of the user within the field of view of the video camera (216) may have changed from the beginning of the looping video stream and the last of that stream. As such, with the use of the face and body recognition module (224), the video looping module (220) may not stop recording the looping video stream until the face and body recognition module (224) has detected that the user has placed his or her face and body in roughly the same location it was at when the video looping module (220) first started to create the looping video stream. This provides for a looping video to be presented to other users of the system (FIG. 1, 100) that does not show a visual jump of the user of the computing device (105) between frames of the looping video. As a result, the other users of the system (FIG. 1, 100) will not know that the user of the computing device (105) has caused a looping video stream to be uploaded and that the user may not be paying attention to the videoconference at that moment.

The computing device (105) may further comprise a video overly module (222) that provides, upon activation by the user of the computing device (105), a scene to be overlaid on the background of the video stream acquired by the video camera (216). As briefly mentioned above, the video camera (216) may be a depth aware video camera such as a structured light or time-of-flight camera. Consequently, the video camera (216) may detect, with the help of the face and body recognition module (224), both the user's face and body as well as a objects behind the face and body. Upon detection of a background scenery, the video overly module (222) may place an image over the background of the video stream. The image may be a single color or some alternative image uploaded by the user of the computing device (105). Placement of the image on the background of the video stream allows for the user to hide his or her physical location as well as hide potential personal information that may be discernable. In one example, the video overly module (222) may overlay an image at predefined locations in the image such as a white board. In this example, the user may, based on the static position of the video camera (216), define a specific location in the image to overlay a scene using the video overly module (222) as described above.

The computing device (105) may further comprise an attendee module (228). The attendee module (228) may notify the user of the computing device (105) of all those persons attending the videoconference. This provides each user of the system (FIG. 1, 100) with the ability to know who joins or leaves the videoconference. The computing device (105) may alert the user to persons who join or leave the videoconference regardless of whether the user has initiated the looping video stream or mute function described above. This may be done by the processor (206) initiating the text module (230). The text module (230) may provide text to be displayed on a monitor (235) communicatively coupled to the computing device (105).

The computing device (105) further comprises a speech-to-text module (226). As described above, during operation of the computing device (105) and while the user is attending the videoconference, the user may mute the videoconference at his or her computing device (105) to prevent other participants from hearing the audio picked up by the microphone (218) and proceed to multitask while listening to the audio. Although the user may hear the audio of the videoconference, he or she may be engaged in other activities in order to multitask. In order to allow the user to be brought up to speed quickly regarding the subject matter being discussed, the speech-to-text module (226) may recognize speech from the audio stream and convert that speech into text. With the text module (230), the speech-to-text module (226) may cause the text from the conversion to appear on the monitor (235) of the user's computing device (105).

In one example, a user may indicate on the computing device (FIG. 2, 105) what his or her name is and have that information stored on the data storage device (208) of the computing device (105). When the speech-to-text module (226) converts speech into text and that text matches the user's name, the computing device (105) may alert such an instance to the user via an audio or visual signal. This audio or visual alert is not heard or seen by the other users of the system (FIG. 1, 100). In one example, the audio alert may be a beeping noise or other audio signal generated by a speaker (240) associated with the computing device (105). In one example, the visual alert may be a pop-up notification that appears on the monitor (235) or any other monitor associated with the computing device (105). Various attention notifications may be used including blinking notifications and contrasting colors within the notification.

The user of the computing device (105) will bring his or her attention back to the monitor (235), view the most recent text display on the monitor (235), and react to the conversation if necessary by unmuting the videoconference. By unmuting the videoconference, the looping video is stopped and the other participants are able to see a live video feed of the user of the computing device (FIG. 2, 105). In one example, the text of the conversation appearing on the monitor (235) may disappear allowing the user to view the videoconference without the text once the user has unmuted the videoconference. In another example, the text may remain allowing the user to respond to any question or comment on the subject being discussed while still reviewing the discussion. In yet another example, the user may unmute the computing device (105) by talking into the microphone (218). Doing so may prevent the user from talking while the computing device (105) is muted and having to realize the computing device (105) is still muted and having to repeat what was just said.

If the user hears the alert indicating that his or her name has been spoken, this may indicate that the user should look at the recent text displayed and respond to a question or comment recently given in the videoconference. Other examples exist where a user may indicate any specific word or phrase on which the computing device (105) will alert the user to those words being spoken and will draw the user's attention back to the monitor (235). The user may once again engage with the videoconference.

In one example, the content of the text presented on the monitor (235) may be saved in the data storage device (208). This allows a user of the computing device (105) to review the conversation after the videoconference is over.

As mentioned above, the face and body recognition module (224) may continually detect the face of the user of the computing device (105). In one example, the face and body recognition module (224) may indicate to the processor (206) that the user's face is not in front of the video camera (216). When this occurs the processor (206) may lock the computing device (105) such that no one may access it until the user provides a username, password, or combinations thereof. This allows the user to step away from the computing device (105) without compromising the security of the computing device (105) by leaving it accessible while not being monitored.

Figure 3:
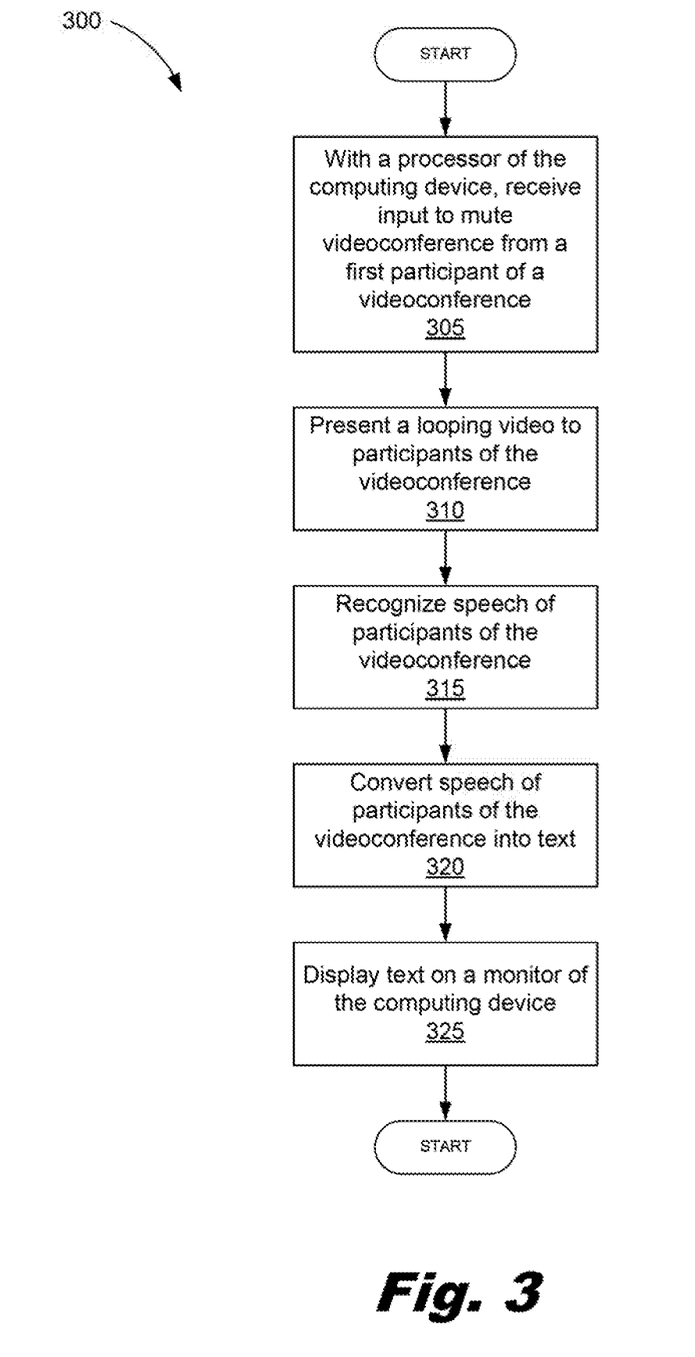
FIG. 3 is a flowchart showing a method of muting a videoconference on a computing device according to one example of the principles described herein.

FIG. 3 is a flowchart show a method (300) of muting a videoconference on a computing device (FIG. 2, 105) according to one example of the principles described herein. The method (300) may begin with the processor (FIG. 2, 206) of the computing device (FIG. 2, 105) receiving input (305) to mute a videoconference from a first participant of the videoconference. The input may be received at the computing device (FIG. 2, 105) from a first participant actuating an input device communicatively coupled to the computing device (FIG. 2, 105).

Receiving input (305) to mute the videoconference causes the processor (FIG. 2, 206) to present (310) a looping video to participants of the videoconference. As discussed briefly above, the looping video may be obtained previous to receiving input (305) to mute the videoconference. In another example, the looping video may be obtained by the video looping module (FIG. 2, 220) after receiving input (305) to mute the videoconference. This may be done by requesting the user of the computing device (FIG. 2, 105) to present his or her face in front of the video camera (FIG. 2, 216) as described above and obtaining a looping video as described above.

The method (300) may continue with recognizing (315) the speech of participants of the videoconference. The processor (FIG. 2, 206) may use the speech-to-text module (FIG. 2, 226) to recognize the conversation that is taking place during the videoconference. Once speech is recognized (315), the method may continue with the speech-to-text module (FIG. 2, 226) being used by the processor (FIG. 2, 206) to convert (320) the speech of the participants of the videoconference into text. This text is then displayed (325) on the monitor (FIG. 2, 235) of the computing device.

Although the method described in connection with FIG. 3 describes presenting (310) a looping video to participants of the videoconference before recognizing (315) the speech of the participants of the videoconference, other exemplary methods are contemplated by the present specification. For example, speech may recognized (315) before a loping video is presented (310) to the participants of the videoconference. It is contemplated by the present specification that other processes described in connection with the method of FIG. 3 may be rearranged without departing from the scope of the principles described herein.

The method of FIG. 3 may further be implemented by computer usable program code. The computer usable program code may be provided to a processor of a general purpose computer, special purpose computer, or other programmable data processing apparatus to produce a machine, such that the computer usable program code, when executed via, for example, the processor (FIG. 2, 206) of the computing device (FIG. 2, 105) or other programmable data processing apparatus, implement the functions or acts specified in the flowchart and/or block diagram block or blocks. In one example, the computer usable program code may be embodied within a computer readable storage medium as described above with the computer readable storage medium being part of the computer program product.

The specification and figures describe a videoconferencing system and method of muting a videoconference on a computing device. The system provides a user of the computing system to visually and audibly conceal a first participant's action from other participants in a videoconference when the first participant mutes the videoconference. This allows the first participant to engage in multitasking while still being able to be notified by the computing device if and when predefined words are said during the videoconference.

The preceding description has been presented to illustrate and describe examples of the principles described. This description is not intended to be exhaustive or to limit these principles to any precise form disclosed. Many modifications and variations are possible in light of the above teaching.

What is claimed is:

1. A video conferencing system to conduct a videoconference, the video conferencing system comprising:
a computing device comprising a processor that, upon receiving input to mute the videoconference from a first participant of the videoconference:
creates a looping video and displays the looping video to a number of participants of the videoconference, wherein creation of the looping video comprises receiving a video stream from a video camera communicatively coupled to the computing device for a predetermined period of time, and further wherein the video camera uses face and body recognition to determine if the first participant is in front of the camera and when the first participant is in front of the camera, the camera begins to record the video stream for the looping video; and
converts detected speech of a number of participants of the videoconference into text and displays the text on a monitor of the computing device.

2. The videoconferencing system of claim 1, wherein the video camera stops recording the looping video only when it is determined that the first participant is in the same location in front of the video camera as when the video camera began recording the looping video.

3. The videoconferencing system of claim 1, wherein the processor unmutes the videoconferencing system when the first participant's voice is detected by a microphone communicatively coupled to the computing device.

4. The videoconferencing system of claim 1, wherein the processor causes an alert to be generated when a word within the text converted from the speech is detected; wherein the alert is an audio alert, a visual alert, or combinations thereof.

5. A method of muting a videoconference on a computing device, comprising:
with a processor of the computing device, receiving input to mute the videoconference from a first participant of the videoconference;
creating a looping video by receiving a video stream from a video camera communicatively coupled to the computing device for a predetermined period of time, wherein the video camera uses face and body recognition to determine if the first participant is in front of the camera and when the first participant is in front of the camera, the camera begins to record the video stream for the looping video;
presenting the looping video to participants of the videoconference;
recognizing speech of participants of the videoconference;
converting speech of participants of the videoconference into text; and
displaying text on a monitor of the computing device.

6. The method of claim 5, wherein the video camera stops recording the looping video only when it is determined that the first participant is in the same location in front of the video camera as when the video camera began recording the looping video.

7. The method of claim 5, wherein the processor unmutes the videoconferencing system when the first participant's voice is detected by a microphone communicatively coupled to the computing device.

8. The method of claim 5, further comprising generating an alert when a word within the text converted from the speech is detected; wherein the alert is an audio alert, a visual alert, or combinations thereof.

9. A computer program product for muting a videoconference on a computing device, the computer program product comprising:
a non-transitory computer readable storage medium comprising computer usable program code embodied therewith, the computer usable program code comprising computer usable program code to, when executed by a processor:
receive input to mute the videoconference from a first participant of a videoconference;
recognize a body image of the first participant, record a looping video of the first participant, and present the looping video to participants of the videoconference, wherein creation of the looping video is completed by receiving a video stream from a video camera communicatively coupled to the computing device for a predetermined period of time;
recognize speech of participants of the videoconference;
convert speech of participants of the videoconference into text; and
display text on a monitor of the computing device and alert the first participant when text predefined by the first participant is displayed on the monitor;
and further wherein:
the video camera uses face and body recognition to determine if the first participant is in front of the camera and when the first participant is in front of the camera, the camera begins to record the video stream for the looping video;
the video camera stops recording the looping video only when it is determined that the first participant is in the same location in front of the video camera as when the video camera began recording the looping video; and the video camera stops recording the looping video only when it is determined that the first participant is in the same location in front of the video camera as when the video camera began recording the looping video.

10. A video conferencing system comprising:

a computing device comprising a processor that, upon receiving input to mute a videoconference from a first participant of the videoconference:

creates a looping video, wherein creation of the looping video comprises receiving a video stream from a video camera communicatively coupled to the computing device during the video conference, and wherein the video camera is to begin to record the video stream for the looping video based on a determination by the video camera using face and body recognition that the first participant is in front of the camera;

displays the looping video to a number of participants of the videoconference; and converts detected speech of a number of participants of the videoconference into text and displays the text on a monitor of the computing device.

* * * * *